(12) United States Patent
Gonzalez Cuadrado (10) Patent No.: US 8,589,131 B2
(45) Date of Patent: Nov. 19, 2013

(54) REAL-TIME SIMULATION PROCEDURE FOR A HELICOPTER ROTOR

(75) Inventor: Miguel Gonzalez Cuadrado, Madrid (ES)

(73) Assignee: Indra Sistemas, S.A., Alcobendas (ES)

( * ) Notice: Subject to any disclaimer, the term of this patent is extended or adjusted under 35 U.S.C. 154(b) by 152 days.

(21) Appl. No.: 12/673,670

(22) PCT Filed: Aug. 16, 2007

(86) PCT No.: PCT/ES2007/070152
§ 371 (c)(1),
(2), (4) Date: Jul. 23, 2010

(87) PCT Pub. No.: WO2009/022033
PCT Pub. Date: Feb. 19, 2009

(65) Prior Publication Data
US 2011/0040534 A1    Feb. 17, 2011

(51) Int. Cl.
*G06F 17/50* (2006.01)
*G06F 7/60* (2006.01)
*G06G 7/48* (2006.01)

(52) U.S. Cl.
USPC .............. 703/7; 703/1; 703/2; 703/6; 703/8

(58) Field of Classification Search
USPC ........................................................ 703/7
See application file for complete search history.

(56) References Cited

U.S. PATENT DOCUMENTS

| | | | |
|---|---|---|---|
| 3,645,014 A | 2/1972 | Bramson et al. | |
| 5,446,666 A * | 8/1995 | Bauer ................ | 701/4 |
| 5,860,807 A * | 1/1999 | McFarland et al. ............. | 434/33 |
| 5,879,131 A * | 3/1999 | Arlton et al. ............... | 416/223 R |
| 6,168,384 B1 * | 1/2001 | Vanmoor ....................... | 416/243 |
| 6,497,385 B1 * | 12/2002 | Wachspress et al. .......... | 244/7 R |
| 6,948,906 B2 * | 9/2005 | Leishman et al. ............. | 415/119 |
| 7,082,371 B2 * | 7/2006 | Griffin et al. ................... | 702/56 |
| 7,236,914 B1 * | 6/2007 | Zyskowski ........................ | 703/8 |
| 7,359,841 B1 * | 4/2008 | Hixon ............................... | 703/2 |

(Continued)

FOREIGN PATENT DOCUMENTS

| | | |
|---|---|---|
| FR | 1 487 362 | 7/1967 |
| GB | 1 047 365 | 11/1966 |

OTHER PUBLICATIONS

Bengin, Aleksandar. "Three-Dimensional Rotor Flow Calculation", Nov. 2005.*

(Continued)

*Primary Examiner* — Shambhavi Patel
(74) *Attorney, Agent, or Firm* — Oblon, Spivak, McClelland, Maier & Neustadt, L.L.P.

(57) ABSTRACT

This procedure proposes the appropriate equations that determine the rotor movement in order to obtain the aerodynamic actions for each blade in each iteration (the forces that are transmitted to the helicopter and the moments with respect to the articulations), and they are resolved by discretizations made in the rotor disc, such that that the blade elements of the partition are connected to the disc, which does not rotate, instead of to each blade. The blades pass through an azimuth range in each iteration, making a division of each blade longitudinally into $n_e$ elements, and the rotor disc into $n_a$ sectors, corresponding to divisions of the range of azimuth angles. Therefore, partitions are made on $n_e \cdot n_a$ blade elements, identifying each blade element by means of its distance to the rotor axis and its azimuth angle.

13 Claims, 4 Drawing Sheets

(56) References Cited

U.S. PATENT DOCUMENTS

| | | | |
|---|---|---|---|
| 7,383,136 B1* | 6/2008 | Griffin et al. | 702/56 |
| 7,574,338 B1* | 8/2009 | Kaul | 703/7 |
| 7,630,869 B2* | 12/2009 | Shen et al. | 703/6 |
| 7,702,494 B1* | 4/2010 | Slavik | 703/7 |
| 7,788,071 B2* | 8/2010 | Bond et al. | 703/6 |
| 8,177,600 B2* | 5/2012 | Huang et al. | 446/37 |
| 2008/0219850 A1* | 9/2008 | O'Connor et al. | 416/223 R |
| 2009/0112535 A1* | 4/2009 | Phillips | 703/2 |
| 2010/0010794 A1* | 1/2010 | Sweers | 703/8 |
| 2011/0112806 A1* | 5/2011 | Kisor et al. | 703/2 |

OTHER PUBLICATIONS

Clarkson et al. "'Signposting', A Parameter-driven Task-based Model of the Design Process", Research in Engineering Design (2000)12:18-38.*

Chattopadhyay et al. "Application of optimization methods to helicopter rotor blade design", Structural Optimization 2, 11-22 (1990).*

He et al. "Fluid-Structural Coupling Effects on the Dynamics of Mistuned Bladed Disks", AIAA Journal vol. 45, No. 3, Mar. 2007.*

Heise et al. "CFD Simulation gf Helicopter Flow Fields Using an Actuator Disk Main Rotor Model", Oct. 2007.*

Ganguli, R. "Optimum Design of a Helicopter Rotor for Low Vibration using Aeroelastic Analysis and Response Surface Methods", Journal of Sound and Vibration (2002) 258(2), 327-344.* van Nieuwstadt et al. "Control of a Rotor Speed for a Model Helicopter: A Design Cycle", 2007.*

Barlas, Thanasis. "Smart Rotor Blades and Rotor Control for Wind Turbines—State of the Art", 2007.*

Geissler et al. "Active Dynamic Flow Control Studies on Rotor Blades", 2001.*

\* cited by examiner

FIG. 8

REAL-TIME SIMULATION PROCEDURE FOR A HELICOPTER ROTOR

TECHNICAL SECTOR OF THE INVENTION

This invention refers to a real-time simulation procedure for the rotor of a rotary wing aircraft based on the blade elements. This procedure is applicable to the aeronautical industry and especially to helicopter pilot instruction.

PROBLEM TO BE SOLVED AND STATE OF THE ART

The procedures known to date for helicopter rotor simulation use methods that, as a general rule, involve the study of equations that govern the rotor performance based on partitions of the blade elements, whose execution times depend on the rotor rotational velocity. These procedures are very precise but are also very costly and slow, especially if the aim is to perform a real-time simulation, which is of particular interest for training pilots of this type of aircraft. In other words, with the known helicopter rotor performance simulation procedures, a rapid simulation is inconsistent with their precision and cost. The procedure proposed by this invention solves this problem, such that greater speed of simulation does not imply less precision or higher cost.

In the virtualization of helicopter performance, it is especially difficult to simulate the conditions that determine the forces on the flapping articulation and the forces on the drag articulation, as well as the resulting moments in both the flapping and drag articulations. The invention proposed herein describes a new procedure to simulate the performance of a helicopter rotor, and especially to calculate the aforementioned forces and moments, in order to resolve the equations that govern rotor operation by making partitions in the rotor disc instead of in each blade. In this way, the rotor actions can be more rapidly determined compared to other procedures known to date, thus cutting costs and enabling a faster real-time simulation.

There are various known references to systems for helicopter simulation. Document U.S. Pat. No. 3,645,014 describes a helicopter simulator that is provided with a system to calculate the forces and moments to which the rotor is subjected, for which purpose it proposes the equations that govern the performance of the different rotor blades. However, the procedure described in this invention differs significantly from that document in the way it calculates the forces and moments to which the rotor is subjected and its subsequent implementation Document GB 1562309 describes a method and a device to simulate a helicopter during its ground maneuvers.

Document EP 872819 describes a helicopter simulation unit with a multitude of control modules based on logic support, where multiple simulation experiences can be presented to the user depending on the modules that are connected. However, it does not detail a simulation procedure or a simulator such as the ones described in this invention.

Document U.S. Pat. No. 5,860,807 describes a method to simulate helicopter turbulence via finite elements, which uses a geometric and temporal distribution algorithm that maintains the statistical characteristics of the range of turbulences on the rotor disc and applies a turbulent model to the blades of the helicopter rotor instead of to its center of gravity.

On the other hand, document JP 2004155218 illustrates a helicopter blade simulation method that is used to analyze the blade tip stall.

DESCRIPTION OF THE INVENTION

The proposed invention describes a real-time performance simulation procedure for the rotor (first rotor) of a rotary wing aircraft, which can optionally include a second rotor. This procedure comprises the operations to:

determine the geometric data of one blade of the first rotor, on the basis of which the movement of this first rotor is determined;

determine the external actions that affect each blade of this first rotor in each iteration; and discretize the blades of the first rotor into blade elements to identify the dynamic balance of this first rotor, and it is also characterized by two facts:

a) the discretization is done on the first rotor disc instead of on the blade itself and, therefore, each of these blade elements is connected to this disc, which does not rotate, instead of to each blade, and b) this discretization divides the first rotor disc into $n_a$ sectors and each blade longitudinally into $n_e$ blade elements.

In this procedure, each blade element is identified by means of its distance r to the first rotor axis and its azimuth angle $\psi$. Moreover, the aforementioned $n_a$ sectors of the disc of this first rotor correspond to divisions of the range of azimuth angles.

In the described procedure, the geometric data that are determined for a blade are basically the torque distribution along the blade $\theta_0(r)$ and the chord distribution along the blade $c(r)$. Likewise, the external actions that are determined to act on a blade are: the local angle of attack of the blade $\alpha_r$, the local Mach number $M_r$, and the local lift, drag and moment coefficients of each blade $c_l$, $c_d$ and $c_m$, respectively.

The procedure also comprises the operations to:

a) express the flapping $\beta$ and the drag $\zeta$ as a function of azimuth $\psi$, using for this purpose a Fourier series development:

$$f(\psi) = a_o + \sum_{i=1}^{n} [a_i \cdot \cos(i\psi) + b_i \cdot sen(i\psi)]$$

b) minimize the errors associated with the dynamic balance calculation by calculating virtual works with coefficients analogous to the Lagrange multipliers, $Q_{ao}$, $Q_{ai}$ and $Q_{bi}$, for both cases of flapping $\beta$ and drag $\zeta$, expressing these multipliers as a function of the coefficients $a_0$, $a_i$, and $b_i$, c) reiterate the calculation process in order to minimize the total moments, using a certain characteristic scheme convergence time.

It has been verified that, in this procedure, the minimum characteristic time that is reached is of the order of four times the integration step.

During the procedure, at the end of each iteration, the induced velocity for each blade element is calculated, and this will be used in the next iteration to obtain the aerodynamic velocity of the blade element. To calculate the induced velocity, the local induced velocity $v_i(s)$ and the induced velocity resulting from the aerodynamic force of a blade element $v_i^+(s)$ are related via a standard relationship $v_i(s)=G(s)v_i^+(s)$, where $G(s)$ is a transfer function that can be approximated by the following expression as a function of the characteristic time $\Delta t$:

$$G(s) = \frac{\left(\frac{2}{\Delta t}\right)^2}{\left(s + \frac{2}{\Delta t}\right)^2}$$

When there is interference between the first rotor and a very close second rotor, e.g. a tandem rotor or a rotor counter-rotating on the same axis as the first rotor, the procedure also comprises the inclusion, in the calculation of the aerodynamic velocity of each blade element of each rotor, of not only the induced velocity of the first rotor but also that of the other rotor, to obtain a reference induced velocity $\vec{v}_{i_p}$, resulting from the action of this second rotor prevailing at a specific point of the first rotor disc, defined by its coordinates $(r_{ip}, \psi_{ip})$, and filtering of this reference induced velocity $\vec{v}_{i_p}$.

The procedure accounts for the variation in the lift due to the so-called ground effect, which is modeled by means of the reduction in induced velocity that it causes, such that the induced velocity with ground effect $(v_i)_{IGE}$ is related to the induced velocity without ground effect $(v_i)_{OGE}$ via the ground effect factor, $k_G$, which is the ratio between these magnitudes.

This ground effect factor $k_G$ is also defined as a function of the following parameters: rotor radius R, rotor distance to the ground $z_G$, and the distance to the ground at which it is considered that the rotor is outside the ground effect $z_{G\,max}$ where $k_G$:

$$k_G = \frac{1 - \left(\frac{R}{4 \cdot z_G}\right)^2}{1 - \left(\frac{R}{4 \cdot z_{Gmax}}\right)^2}$$

The invention also comprises a physical performance simulator for the rotor of a rotary wing aircraft which uses the described procedure.

DESCRIPTION OF THE DRAWINGS

Following is a description of the form of embodiment of the object of this invention, and for a better understanding thereof it is accompanied by drawings, provided merely by way of illustrative, non-limitative examples, where.

DESCRIPTION OF A FORM OF EMBODIMENT

Figure 1:
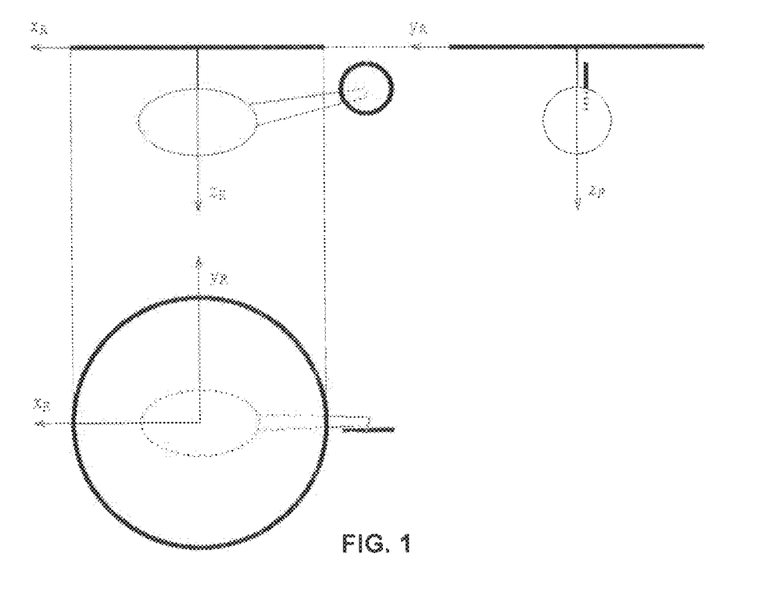
FIG. 1 shows a generic helicopter whose rotor is going to be modeled, with schematic ground plan, elevation and lateral views, in which a system of axes $(x_R, y_R, z_R)$ associated to the rotor has been defined.

The helicopter subject to the simulation proposed by this invention is schematically represented by the three views (elevation, ground plan and lateral) of FIG. 1. For this helicopter, some reference rotor axes $(x_R, y_R, z_R)$ are defined, as given by: axis $z_R$ in the axis of rotation downward, axis $x_R$ perpendicular to $z_R$ forward, and axis $y_R$ to the right of $x_R$ and $z_R$.

In addition to the system of rotor axes $(x_R, y_R, z_R)$ associated with the helicopter rotor, other reference systems have been defined that can be easily understood by looking at FIG. 2: a system of blade axes $(x_P, y_P, z_P)$ and a system of virtual blade axes $(x_{P'}, y_{P'}, z_{P'})$; these reference systems will be described hereinafter. In this description, this helicopter rotor is also called the first rotor.

Figure 2:
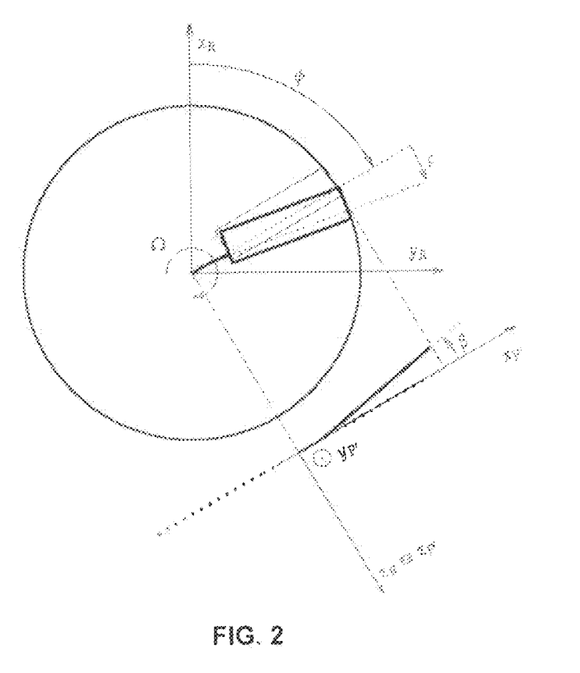
FIG. 2 shows the convention of signs used for the flapping $\beta(\psi)$ and for the drag $\zeta(\psi)$ of the rotor, for which a blade reference system $(x_P, y_P, z_P)$ and a virtual blade reference system $(x_{P'}, y_{P'}, z_{P'})$ are used.

FIG. 2 also shows the convention of signs used for the azimuth angle $\psi$, the flapping $\beta$ and the drag $\zeta$. The azimuth angle $\psi$ is worth 0 forward, in the drawing $(x_R, z_R)$, and $\pi/2$ to the right, in the drawing $(y_R, z_R)$. The rotor rotational velocity $\Omega = \dot{\psi}$ is positive as per $z_R$. The blade reference axes $(x_P, y_P, z_P)$ coincide with the rotor axes when $\psi = \beta = \zeta = 0$, and they always accompany the blade in its rotation, flapping and drag as a rigid solid. The virtual blade reference axes $(x_{P'}, y_{P'}, z_{P'})$ coincide with the blade axes when $\beta = \zeta = 0$, and with the rotor axes when $\psi = 0$; they accompany the blade in its rotation but not in its flapping or drag. The flapping $\beta$ is positive upward, and the drag $\zeta$ is positive in the direction of overtaking the blade, i.e. in the same direction as $\psi$ (with this sign convention for the drag, it should be called "lead").

Figure 3:
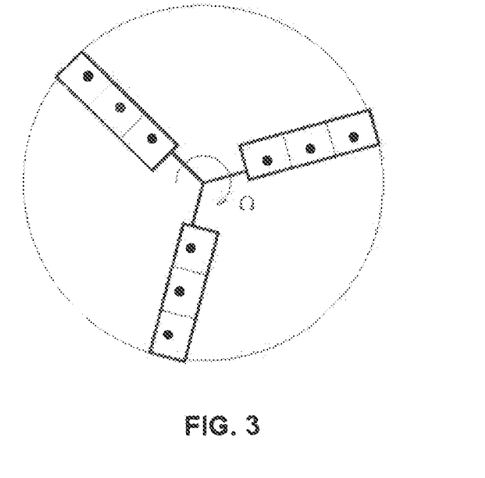
FIG. 3 shows a typical diagram of partition into the blade elements normally used in the state of the art.

To date, helicopter simulation models have normally used a blade element model, which assumes that each element of each blade behaves at all times as a two-dimensional profile. One possible implementation is to divide each blade into a certain number of blade elements $(n_e)$, and these elements are connected to it along its span. FIG. 3 shows a classic partition like the ones used in the past, and which are still used today, where each blade is partitioned by using, for example, three blade elements $(n_e = 3)$. By formulating the corresponding equations that determine the rotor movement, the aerodynamic actions for each blade are obtained in each iteration; the forces are transmitted to the helicopter, and the moments with respect to the articulations determine the evolution of each blade's flapping and drag. The main complication that arises on applying this method is that this implementation requires a high frequency of integration to have enough azimuth resolution when calculating the flapping, drag and derivatives (very high frequencies of flapping and drag evolution would have to be reproduced).

Figure 4:
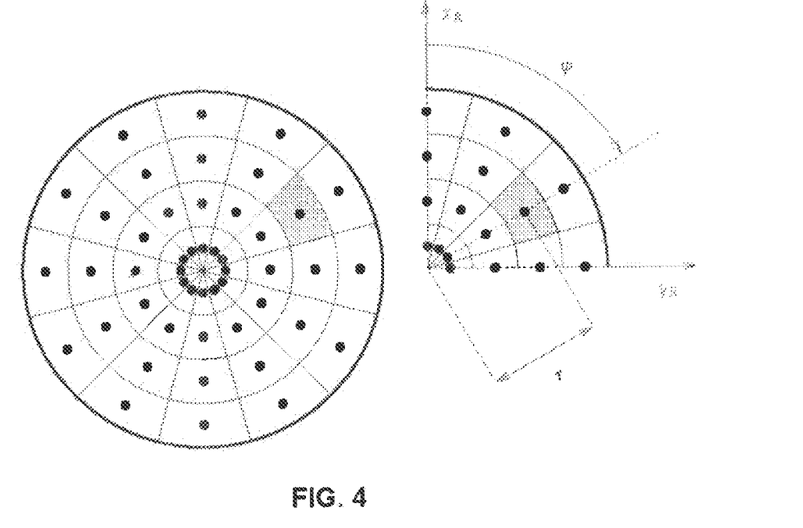
FIG. 4 shows a new partition made in the rotor disc, as described in this invention.

With the model of this invention, an alternative to the blade element model is proposed that decreases the frequency of integration and the burden of calculation associated with resolution of the equations; FIG. 4 shows an example of the partition that is made. According to this procedure, the discretization is done on the rotor disc instead of on each blade, meaning that the blade elements of the partition are connected to the disc (which does not rotate) instead of to each blade. With this procedure of connecting the blade elements to the rotor disc and not to the blade, each blade passes through an azimuth range in one iteration; the corresponding blade elements provide the aerodynamic actions on the helicopter. Each blade is divided longitudinally into $n_e$ elements, and the rotor disc into $n_a$ sectors, corresponding to divisions of the range of azimuth angles. Therefore, partitions are made on $n_e \cdot n_a$ blade elements. Each blade element is identified by means of its distance to the rotor axis r and its azimuth angle $\psi$. FIG. 4 shows a possible discretization with 4 equispaced elements per blade ($n_e=4$), and 12 angular sectors ($n_a=12$, such that $n_e \cdot n_a = 4 \cdot 12 = 48$). As seen in FIG. 4, the position in which the calculations of each blade element are made is marked with a point.

Figure 5:
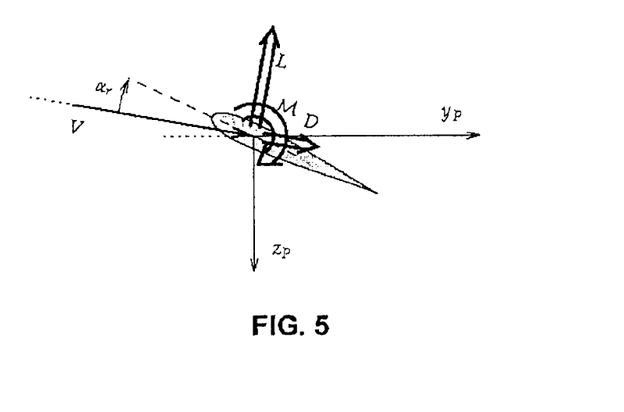
FIG. 5 shows a blade section, indicating some of the aerodynamic actions to which the blade is subjected.

The helicopter rotor blades, when they are in motion, are subject to a series of aerodynamic forces; FIG. 5 shows a section of a generic rotor blade, as well as some of the aerodynamic actions to which this blade is subjected. FIG. 5 also contains a drawing of the blade axis reference system ($x_P$, $y_P$, $z_P$), where axis $x_P$ is orthogonal to the plane defined by this figure. The blade has an angle of attack $\alpha_i$ on the incident flow V, providing a lift L, a drag D and a pitching moment M. For each blade element as per the partition proposed in this invention with $n_e \cdot n_a$ sectors, the graphs of aerodynamic forces of the profile as a function of the local aerodynamic parameters are known, basically the distance r of the blade element to the rotor axis, the angle of attack $\alpha_r$ and the local Mach number $M_r$. Also known are the torque distribution along the blade $\theta_0(r)$ and the chord distribution along the blade $c(r)$; the usual thing is for $\theta_0(r)$ to be linear and $c(r)$ constant.

Each blade element in each azimuth produces a lift $dL/dr$ and a drag $dD/dr$ per unit of span along the blade. The aerodynamic actions of the blade element do not include moments or lateral force, although it is easy to introduce them if they are eventually needed. To calculate the lift and drag of the blade element, the local aerodynamic conditions (at least the Mach number $M_r$ and angle of attack $\alpha_r$) must first be calculated. This is done by identifying movements of rotation, flapping and drag, adding the velocity owing to the movement of the helicopter as a rigid solid, and adding the contributions of wind and induced velocity. The angle of geometric torque of the blade in each element must be accounted for. The induced velocity is obtained for each blade element in each azimuth separately, instead of assuming a uniform induced velocity in the disc as a whole.

The described procedure enables the calculation of the forces and moments to which the rotor blades are subjected when a helicopter is in motion, as a function of a given series of parameters. Once these forces and moments are known, the rotor performance can be determined and this is what really enables its simulation. Therefore, the steps followed by the simulation procedure are basically as follows:

a) Determination of the geometric blade data, basically the torque distribution along the blade $\theta_0(r)$ and the chord distribution along the blade $c(r)$ (usually $\theta_0(r)$ is linear and $c(r)$ constant).
b) Determination of the external actions on the blade: the blade's local angle of attack $\alpha_i$, the local Mach number $M_r$, and each blade's local lift, drag and moment coefficients $c_l$, $c_d$ and $c_m$, respectively.
c) Identification of the dynamic rotor balance (sum of forces and sum of moments equal to zero).

Once these steps are completed, we then proceed to:
1) Express the flapping $\beta$ and the drag $\zeta$ as a function of the azimuth $\psi$, using a Fourier series development to do so:

$$f(\psi) = a_o + \sum_{i=1}^{n} [a_i \cdot \cos(i\psi) + b_i \cdot sen(i\psi)]$$

2) Minimize the errors associated with the dynamic balance calculation by calculating virtual works with appropriate coefficients.

3) Reiterate the calculation process so that the total moments tend to be minimized at all times. For this purpose, the characteristic scheme convergence time must be studied, because it will set a limit on the frequencies that can be reproduced under non-stationary conditions. As will be explained hereinafter, it has been verified that the characteristic time that is reached is of the order of four times the integration step.

The total force, the total moment, the rotor torque and the moments on the plate are obtained by integrating aerodynamic and inertial forces and moments on part of the rotor surface. The integration variables are r and $\psi$.

For the integration, the field of forces and moments on the rotor is adjusted to rotor axes by an analytically piecewise integratable function, using as control points the stations to be discretized. This function is integrated on the rotor surface swept by the blades in the time corresponding to one iteration. This gives the total force and total moment referred to the origin of the rotor axes, torque in the axis and moments on the plate.

On calculating the rotor moments (pitching and warping moments, and torque), the articulation mechanism between the rotor axis and the blade must be accounted for. If, for example, the blade is fully articulated in flapping, no moments are transmitted as per the articulation axis, but the total force applied to the articulation does generate total moment. This total force in the articulation includes the resulting reaction of the blade inertia forces.

For each azimuth, the total moments of flapping and drag caused by aerodynamic forces are calculated. For these calculations, the aerodynamic forces expressed in blade axes are used.

The integrations are done numerically, using the blade elements that are discretized. It is similar to the integration of the aerodynamic actions in the rotor, but it is done separately for each discretized azimuth, i.e., it is integrated into one variable (r) instead of two (r and $\psi$).

As already indicated, the flapping $\beta$ and drag $\zeta$ functions can be defined by Fourier coefficients as a function of the azimuth $\psi$, using a Fourier series development for this purpose:

$$f(\psi) = a_o + \sum_{i=1}^{n} [a_i \cdot \cos(i\psi) + b_i \cdot sen(i\psi)]$$

For a correct simulation, under both stationary and transitory conditions, the flapping and drag functions should give rise to a kinematics of the blades and some resulting actions (aerodynamic, inertial and external actions on the blades) that are in dynamic balance in flapping and drag at all times, i.e., they comply with the condition that the total moment in flapping with respect to the flapping articulation and the total moment in drag with respect to the drag articulation (including inertia in both cases) are zero for each blade at any given time. In general, this does not happen and the Fourier development coefficients that will satisfy the dynamic balance must be found.

A possible procedure consists of finding, for each moment, the series of Fourier coefficients that minimizes the aforementioned total moments. This is impractical for a real-time simulation because it would require many evaluations of the complete dynamic model, which would entail a lot of execution time and there would be no assurance that it could be completed in a set time.

Another alternative is to implement a loop that feeds back the dynamic balance errors to the Fourier coefficients so that the total moments tend to be minimized at all times. This is a practical solution for a real-time simulation because it requires little execution time (and no re-evaluation of the dynamic model), and it would be the same in each integration step. However, the characteristic scheme convergence time has to be studied, because it will place a limit on the frequencies that can be reproduced under non-stationary conditions. In practice, the characteristic time that is reached is of the order of four times the integration step; this is usually sufficient for the real-time simulation for training.

The equations for rotor balance (balance of forces and moments) on the flapping articulation are:

$$-\vec{F_{h_b}} = \vec{F_e} + \Omega^2 \cdot m_p \cdot \vec{r_{cg}} \vec{i} + (r_{cg} - e_b) \cdot m_p \cdot \ddot{\beta} \vec{k}$$

$$\vec{M_{h_b}} = \vec{M_{e_b}} - (\vec{M_{e_b}} \cdot \vec{j}) \vec{j}$$

where the terms $\vec{F_{h_b}}$, $\vec{F_e}$, $\vec{M_{h_b}}$ and $\vec{M_{e_b}}$ are, respectively, the force that acts on the vehicle applied to the flapping articulation, the force resulting from the external forces on the blade, the moment on the flapping articulation and the moment of the external forces in axes "x" and "z" on the flapping hinge. Other terms used in the equation are the blade mass $m_p$, and the position of the blade's center of gravity $r_{cg}$.

The total flapping moment is obtained as the integral along the blade of the arm multiplied by the force in the axis. The arm is $r_{cg} - e_b$, where $e_b$ is the distance from the rotor axis to the flapping articulation.

The second derivative of the flapping function can be expressed as:

$$\ddot{\beta} \approx \frac{1}{I_b}(M_{e_{b_1}} - \Omega^2 \cdot I_{bc} \cdot \beta)$$

and, in turn, the terms $M_{e_b}$, $I_b$, $I_{bc}$ are, respectively, the flapping moment of the external forces, the moment of inertia of the blade with respect to the flapping articulation and a mass property of the blade. The latter two are defined by:

$$I_b = \int_{e_b}^{R} (r - e_b)^2 dm$$

$$I_{bc} = \int_{e_b}^{R} r(r - e_b) dm$$

The equations for rotor balance (balance of forces and moments) on the drag articulation are:

$$-\vec{F_{h_a}} = \vec{F_e} + \Omega^2 \cdot m_p \cdot \vec{r_{cg}} \cdot (r_{cg} - e_a) \cdot m_p \cdot \ddot{\zeta} \vec{j}$$

$$\vec{M_{h_a}} = \vec{M_{e_a}} - (\vec{M_{e_a}} \cdot \vec{k}) \vec{k}$$

where the terms $\vec{F_{h_a}}$, $\vec{F_e}$, $\vec{M_{h_a}}$ and $\vec{M_{e_a}}$ are, respectively, the force that acts on the vehicle applied to the drag articulation, the force resulting from the external forces on the blade, the moment on the drag articulation and the moment of the external forces on the drag hinge.

The total drag moment is obtained as the integral along the blade of the arm multiplied by the force in the axis. The arm is $r_{cg} - e_a$, where $e_a$ is the distance from the rotor axis to the drag articulation.

The second derivative of the drag function can be expressed as:

$$\ddot{\zeta} \approx \frac{1}{I_a}(M_{e_{a_z}} - \Omega^2 \cdot m_p \cdot e_a (r_{eg} - e_a) \cdot \zeta)$$

and, in turn, the terms $$M_{e_{a_z}},$$

$I_a$ are, respectively, the moment of the external forces on the drag articulation and the moment of inertia of the blade with respect to the drag articulation.

It can thus be seen that the balance equations depend on the flapping and drag functions and their derivatives; if these functions are expressed as a Fourier series development, as explained above, the problem now is to find a simple form of the expressions for the coefficients of this development.

As already indicated, one alternative is to implement a loop that feeds back the dynamic balance errors to the Fourier coefficients so that the total forces and moments tend to be minimized at all times. This is very practical for a real-time simulation because it requires little execution time that is the same in each integration step. In practice, it has been verified that, for real-time simulation for purposes of training, it usually suffices that the characteristic time be of the order of four times the integration step.

Figure 6:
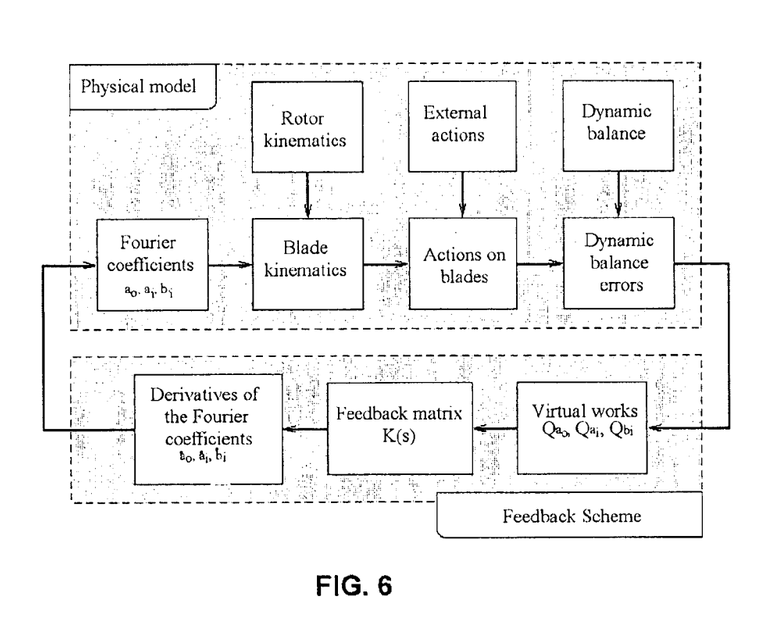
FIG. 6 shows the feedback loop in the calculation of the Fourier coefficients on determining the flapping and drag functions.

The feedback loop implementation is shown in FIG. 6. Once the kinematics of the rotor and its blades is known, along with the external actions and especially those that act on the blades, the dynamic balance is identified in the aforementioned manner, using the force and moment balance equations. These equations are used to find the dynamic balance errors that tend to minimize the total moments, for which purpose the principle of virtual works is applied to obtain coefficients analogous to the Lagrange multipliers $Q_{a0}$, $Q_a$, and $Q_b$, for both cases of flapping and drag. These multipliers $Q_{a0}$, $Q_a$ and $Q_b$ can be expressed as a function of the coefficients $a_0$, $a_i$, and $b_i$, in order to find a transfer function K(s), usually given by a matrix, that relates the coefficients $a_0$, $a_i$, and $b_i$ and their respective derivatives. When new values of the coefficients $a_0$, $a_i$, and $b_i$ are obtained, it will be possible to execute a new iteration, based on the fact that the balance equations are given as a function of the azimuth $\psi$ using the aforementioned Fourier series development.

The feedback matrix K(s) includes disconnection between modes, feedback coefficients for each mode and, if necessary, offset filters for each mode. The multipliers $Q_{a0}$, $Q_a$, and $Q_b$, are passed through the transfer function K(s) to obtain the derivatives of the Fourier coefficients $\dot{a}_0$, $\dot{a}_i$, $\dot{b}_i$.

For the flapping problem, the following approximations are considered as valid:
 local angle of attack: $\alpha_r - \alpha_{r_0} \approx -\beta'(\psi)$
 local lift coefficient: $c_l - c_{l_0} \approx -c_{l_a} \cdot \beta'(\psi)$
 local dynamic pressure: $q - q_0 \approx 0$ In the case of drag, the multipliers $Q_{a0}$, $Q_a$ and $Q_b$ can be approximated with linear functions of $a_0$, $a_i$, and $b_i$; the resulting expressions are as follows:

$$Q_{a_0} = \int_{-\pi}^{\pi} M_\beta(\psi) d\psi \approx -k_i 2\pi a_0$$

$$Q_{a_i} = \int_{-\pi}^{\pi} M_\beta(\psi) \cos i\psi \, d\psi \approx -k_i(i^2-1)\pi b_i - k_a i\pi b_i$$

$$Q_{b_i} = \int_{-\pi}^{\pi} M_\beta(\psi) \operatorname{sen} i\psi \, d\psi \approx -l_i(i^2-1)\pi b_i + k_a i\pi a_i$$

where:

$M_\beta$ is the total moment of the flapping articulation, $k_i = \Omega^2 \cdot I$, where $\Omega$ is the rotor rotational velocity, and I is the approximate moment of inertia of a blade along the blade, $$k_a = \frac{1}{8} c c_{l_a} \rho \Omega^2 R^4,$$

where c is the blade chord, $c_l$ is the slope of $c_l$ versus $\alpha_r$, $\rho$ is the air density and R is the rotor radius.

Therefore, the resulting values of $\dot{a}_0$, $\dot{a}_i$, $\dot{b}_i$, as a function of the multipliers $Q_{a0}$, $Q_a$ and $Q_b$ are:

$$\dot{a}_0 = \frac{1}{m_0} Q_{a_0}$$

$$\begin{bmatrix} \dot{a}_I \\ \dot{b}_I \end{bmatrix} = \frac{1}{m_i} \cdot \begin{bmatrix} -k_I \cdot (i^2 - 1) & -k_a \cdot i \\ +k_a \cdot i & -k_I \cdot (i^2 - 1) \end{bmatrix} \cdot \begin{bmatrix} Q_{a_i} \\ Q_{b_i} \end{bmatrix}$$

or else as a function of $a_i$ and $b_i$:

$$\begin{bmatrix} \dot{a}_I \\ \dot{b}_I \end{bmatrix} = -\frac{1}{m_i} \cdot \pi [k_I^2 \cdot (i^2 - 1)^2 + k_a^2 \cdot i^2] \cdot \begin{bmatrix} a_i \\ b_i \end{bmatrix}$$

the value of the transfer function K(s), the matrix that relates the different coefficients and their derivatives, can be seen in the two preceding expressions. In turn, the values of $m_0$ and $m_1$ are:

$$m_0 = k_I 2\pi \tau_0$$

$$m_1 = (k_I^2 \cdot (i^2-1)^2 + k_a^2 \cdot i^2) \cdot \pi \tau_i$$

where $\tau_0$ is the characteristic time associated with the coefficient $a_0$ and $\tau_i$ the characteristics times associated with the coefficients $a_i$, $b_i$.

As indicated above, it is possible to insert offset filters between the Fourier multipliers and coefficients; if $H_i(s)$ if the offset factor for the coefficients of order i, the feedbacks are:

$$sa_0 = H_0(s) \frac{1}{m_0} Q_{a0}$$

$$s \begin{bmatrix} a_i \\ b_i \end{bmatrix} = H_i(s) \frac{1}{m_i} \begin{bmatrix} -k_I \cdot (i^2 - 1) & -k_a \cdot i \\ +k_a \cdot i & -k_I \cdot (i^2 - 1) \end{bmatrix} \cdot \begin{bmatrix} Q_{a_i} \\ Q_{b_i} \end{bmatrix}$$

Just as with the flapping procedure, the drag function can be treated in a similar way. A development similar to the flapping procedure is used to determine the feedback of the drag function; the differences between the two are indicated below. The linearizations developed are as follows:

local angle of attack:

$$a_r - a_{r_0} \approx \frac{v_i}{r \cdot \Omega} \cdot \zeta'(\psi)$$

local lift coefficient:

$$c_l - c_{l_0} \approx c_{l_a} \cdot \frac{v_i}{r \cdot \Omega} \cdot \zeta'(\psi)$$

local dynamic pressure: $q - q_0 \approx \rho \cdot (r\Omega)^2 \cdot \zeta'(\psi)$ The multipliers for the drag $Q_{a0}$, $Q_a$ and $Q_b$ can be approximated with linear functions of $a_0$, $a_i$, and $b_i$; the resulting expressions are as follows:

$$Q_{a_0} \approx -k_{l_0} 2\pi a_0$$

$$Q_{a_i} \approx (k_{l_2} i^2 - k_{l_a}) \pi a_i - k_a i \pi b_i$$

$$Q_{b_i} \approx (k_{l_2} i^2 - k_{l_a}) \pi b_i + k_a i \pi a_i$$

such that:

$$k_a = \frac{1}{12} c \cdot c_{l_0} \cdot \rho \cdot \Omega \cdot R^3 \cdot (3\Omega R \alpha_{r_0} + 4 v_i)$$

where c is the blade chord, $c_{l\alpha}$ is the slope of $c_{l\alpha}$ versus $\alpha_r$, $\rho$ is the air density, R is the rotor radius and $v_i$ is the local induced velocity.

$k_{l_2} = \Omega^2 \cdot m_p \cdot e_a \cdot r_{cg}$ where $\Omega$ is the rotor rotational velocity, $m_p$ is the blade mass, $e_a$ is the x-axis of the drag articulation and $r_{cg}$, is the x-axis of the blade's center of gravity.

$k_{l_2} = \Omega^2 \cdot I$ where $\Omega$ is the rotor rotational velocity, and I is the approximate moment of inertia of a blade along the blade, For this case, the feedbacks are:

$$sa_0 = H_0(s) \frac{1}{m_0} Q_{a0}$$

$$s \begin{bmatrix} a_i \\ b_i \end{bmatrix} = H_i(s) \frac{1}{m_i} \begin{bmatrix} -(k_{l_2} i^2 - k_{l_0}) & -k_a \cdot i \\ +k_a \cdot i & (k_{l_2} i^2 - k_{l_0}) \end{bmatrix} \cdot \begin{bmatrix} Q_{a_i} \\ Q_{b_i} \end{bmatrix}$$

In turn, the values of $m_0$ y $m_i$ are:

$$m_0 = k_I 2\pi \tau_0$$

$$m_1 = ((k_{l_2} i^2 - k_{l_0}) + k_I^2 \cdot i^2) \cdot \pi \tau_i$$

At the end of each iteration, the induced velocity is calculated for each blade element. This induced velocity will be used in the next iteration to obtain the aerodynamic velocity of the blade element.

Several models can be used to determine the induced velocity. The simplest one is to apply the theory of amount of motion or amount of modified motion. The procedure consists of obtaining the traction per unit of surface area and calculating the induced velocity in the blade element that would give the same traction per unit of surface area. The procedure proposed by this invention consists of relating the local induced velocity and the induced velocity resulting from the aerodynamic force of a blade element via the following ratio:

$$v_i(s) = G(s) v_i^+(s)$$

where $v_i(s)$ is the local induced velocity, $v_i^+(s)$ is the induced velocity resulting from the aerodynamic force of a blade element, and G(s) is a transfer function that can be approximated by the following expression as a function of the characteristic time $\Delta t$:

$$G(s) = \frac{\left(\frac{2}{\Delta t}\right)^2}{\left(s + \frac{2}{\Delta t}\right)^2}$$

The filter G(s) introduces a feedback in the rotor dynamics with characteristic time Δt. This feedback could give rise to frequency responses that are too high to be reproduced by numeric integration, which would cause spurious vibrations in the rotor response. To prevent this, the value of Δt is limited to below a previously selected value $\tau_G$; this value must be greater than the inverse of the integration frequency but as low as possible. Typically it will be around four times the inverse of the integration frequency.

In the case of different blades, the transfer function G(s) connects the mean of the $v_i^+$ of the rotors to the $v_i$ of each rotor. It would not be correct to connect the $v_i^+$ of the rotor of each blade to the $v_i$ of the rotor of the next blade, because the inertia of the air pipe prevents it from changing abruptly due to the pitch of a single blade. It can also be seen that this would be replacing a -KG(s) type of feedback loop with another type $(-KG(s))^b$, which is slower and probably even has the sign changed (an even number of blades means unstable positive feedback, instead of stable negative feedback).

Another specific case that should be considered is interference between rotors; when several rotors are simulated, it can happen that the disc of one of them is completely or partially inside the current-induced flow in another one upstream or downstream. This happens in the case of an anti-torque rotor that is inside the induced flow of the first rotor. It can also happen that there is a reciprocal relation and that one rotor is in the induced flow of another and the second in the induced flow of the first; this is the case of tandem rotors, or rotors counter-rotating on the same axis. The solution in all cases is to include not only each rotor's on induced velocity, but also that of the other rotors, in the calculation of the aerodynamic velocity of each blade element of each rotor. To this end, not only the distribution in the disc but also the spatial distribution of induced flow will have to be taken into consideration.

Figure 7:
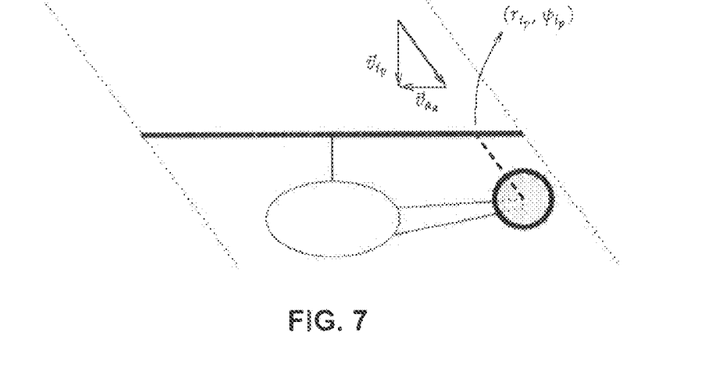
FIG. 7 schematically shows the situation of interference between the first rotor and the anti-torque rotor.

FIG. 7 graphically shows a case of interference between the helicopter's first rotor and the anti-torque rotor. To simplify the figure, a uniform induced velocity distribution has been shown, but this is generally not the case. Since the anti-torque rotor as a whole is affected, and since it is much smaller than the first rotor, a reference induced velocity $\vec{v}_{i_g}$ due to the anti-torque rotor can be calculated. This induced velocity $\vec{v}_{i_p}$ is the one prevailing at a specific point of the first rotor disc, which is defined by its coordinates $(r_{ip}, \psi_{ip})$, and it can be adequately filtered so that it smoothes out over time and becomes attenuated in space and time.

To calculate $(r_{ip}, \psi_{ip})$, it is assumed that the flow is displaced with respect to the air mass without disturbance, i.e., that for a same distribution of induced velocities, it is displaced as a function of the helicopter's aerodynamic velocity.

In each instant of time, the value of $\vec{v}_{i_g}$ obtained in the preceding instant can be used as an approximation to obtain $(r_{ip}, \psi_{ip})$. In this way, to obtain $(r_{ip}, \psi_{ip})$, the intersection with the first rotor of a line that departs from the anti-torque rotor is found; the direction of this line is $\vec{v}_{a_a} - \vec{v}_{i_p}$, where $\vec{v}_{i_p}$ is the aerodynamic velocity of the anti-torque rotor with respect to the air mass without disturbance, and using the past value of $\vec{v}_{i_p}$.

Figure 8:
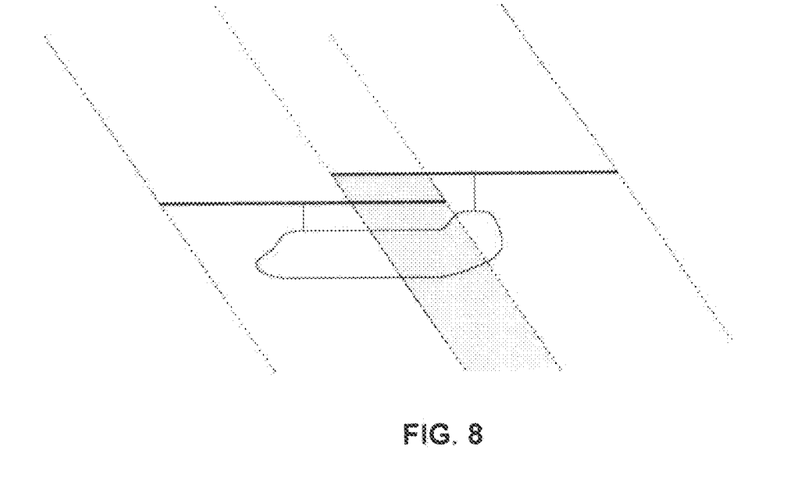
FIG. 8 is a simplified view of the situation of interference between tandem rotors.

If the size of the rotor is not negligible with respect to the distribution of induced flow that affects it, the procedure is the same, except that, for each blade element of the affected rotor, the point $(r_{ip}, \psi_{ip})$ in the other rotor is calculated. This happens, for example, in the case of two tandem rotors, as shown in FIG. 8. To simplify the figure, a uniform induced velocity distribution equal in the two rotors has been shown; as a general rule, the relation between affected points of the two rotors is not reciprocal (as their corresponding induced velocities are not equal), and the distributions are not uniform.

In all cases, to obtain $\vec{v}_{i_p}$ at the point $(r_{ip}, \psi_{ip})$, an interpolation will be necessary between values in the blade elements, and to obtain $(r_{ip}, \psi_{ip})$, the past value of the induced velocity will be used in the past value of $(r_{ip}, \psi_{ip})$.

In the case of rotors very near to each other (e.g., the tandem rotors of FIG. 8), it is possible to neglect the displacement of $(r_{ip}, \psi_{ip})$ with the aerodynamic velocity and induced velocity changes and assume that the interference relationship between a point in one rotor and the corresponding point in the other rotor is fixed, e.g. owing to a vertical induced velocity and a null aerodynamic velocity.

Another effect that should also be considered in the simulation is the so-called ground effect, which is manifested by the variation in lift that occurs when the aircraft approaches the ground; another situation in which the ground effect can be relevant is when the helicopter is in stationary flight and there is a building, e.g. a skyscraper, in the proximity of its vertical.

The ground effect is accounted for in the rotor model only through induced velocity; therefore, any induced velocity model that is used should include ground effect.

The ground effect is modeled by means of the reduction caused in the induced velocity. This reduction acts on the induced velocity caused by each blade element, so that if the delay in establishment of flow is simulated, the induced velocity should be modified for ground effect at source, and not in its application.

Theoretically, the ground effect is manifested as an increase of thrust at constant power, or a decrease of power at constant thrust, or a reduction of induced velocity. The induced velocity inside ground effect $(v_i)_{IGE}$ is related to the induced velocity outside ground effect $(v_i)_{OGE}$ by the ground effect factor, $k_G$, which is the ratio between these magnitudes. $k_G$ is also related to the ratio between the rotor radius R and the distance to the ground $z_G$. It is possible to use, for example, the ground model of Cheeseman's theory (see J. Gordon Leishman, *Principles of Helicopter Aerodynamics*. Cambridge Aerospace Series, 2000), which in its original form relates the induced velocity inside ground effect to the induced velocity outside ground effect with the following equation:

$$\frac{(v_i)_{IGE}}{(v_i)_{OGE}} = k_G = 1 - \left(\frac{R}{4 \cdot z_G}\right)^2$$

This distance $z_G$ is calculated for each blade element perpendicularly to the disc to account for local effects, e.g. non-uniform ground effect in the disc due to obstacles or to the rotor inclination.

To prevent $k_G$ from taking on negative, non-representative values, and to limit the distance at which the ground monitoring system should search for ground under the rotor, a distance to the ground $z_{G\,max}$ at which it is considered that the rotor is outside ground effect is chosen, and $k_G$ is redefined as:

$$k_G = \frac{1-\left(\frac{R}{4\cdot z_G}\right)^2}{1-\left(\frac{R}{4\cdot z_{Gmax}}\right)^2} \text{ limited to the interval [0.1]}$$

It is advisable to refer $z_{G\,max}/R$ to the value of R so that the ground effect influence mill only depend on the dimensionless parameter $z_G/R$.

The considerations concerning the first rotor should be extended to the case of the anti-torque rotor and also to the case in which the helicopter has two tandem rotors, although in this situation the calculation of the aerodynamic velocity of each blade element of each rotor should include not only its own induced velocity, but also that of the other rotors. To this end, the spatial distribution of flow in the rotor disc should be considered together with the distribution of the induced flow.

It should be noted that the grounds for the proposed procedure are valid not only for the real-time simulation of the rotor of a rotary wing aircraft, but also for other devices that employ rotors, e.g. wind generators, turbines, compressors and fans, with the peculiarity of absence of flapping and drag ($\beta=\zeta=0$). Likewise, the study made for the case of a compressible fluid such as air can be extended to the case of non-compressible fluids such as water; consequently, this simulation procedure can also be extended to other objects such as the blades of a ship's propeller.

The invention claimed is:

1. A real-time performance simulation method for a rotary wing aircraft having at least one rotor including a first rotor, the method comprising:
    determining geometric data of one blade of the first rotor, on the basis of which movement of the first rotor is determined;
    determining external forces and moments that affect each blade of the first rotor in each iteration of numerical real-time integration of equations of motion of the rotary wing aircraft;
    discretizing the first rotor into virtual blade elements on which calculation to identify dynamic balance of the first rotor is to be performed, wherein the identifying dynamic balance includes:
    determining, by a processor, the movement of the first rotor to obtain real-time aerodynamic actions that include forces transmitted to the rotary wing aircraft and moments with respect to articulations for each blade in each iteration,
    wherein the discretization is done on a first rotor disc instead of on each blade itself generating the virtual blade elements on an area covering the first rotor disc and each of the virtual blade elements is connected to the first rotor disc, which does not rotate, instead of to each blade, and
    wherein the discretization divides the first rotor disc circumferentially into $n_a$ sectors and radially into $n_e$ sectors, which results in $n_a \times n_e$ virtual blade elements.

2. The method of real-time performance simulation according to claim 1, wherein each virtual blade element is identified by means of its distance r to an axis of the first rotor and its azimuth angle $\psi$.

3. The method of real-time performance simulation according to claim 1 or claim 2, wherein the $n_a$ sectors of the first rotor disc correspond to divisions of the range of azimuth angles.

4. The method according to claim 1 or 2, wherein the geometric data that are determined for the blade are basically torque distribution along the blade $\theta_0(r)$ and chord distribution along the blade $c(r)$.

5. The method according to claim 1 or 2, wherein the external forces and moments that act on the blade include blade's local angle of attack $\alpha_r$, local Mach number $M_r$, and each blade's local lift, drag and moment coefficients $c_l$, $c_d$ and $c_m$, respectively.

6. The method according to claim 1 or 2, wherein the step of determining the movement further comprises:
    expressing flapping $\beta$ and drag $\zeta$ as a function of azimuth $\psi$, using a Fourier series development:

$$f(\psi) = a_0 + \sum_{i=1}^{n}[a_i \cdot \cos(i\psi) + b_i \cdot sen(i\psi)],$$

minimizing errors associated with the dynamic balance calculation by calculating virtual works with coefficients corresponding to Lagrange multipliers for both cases of the flapping $\beta$ and the drag $\zeta$, expressing these multipliers as a function of coefficients $a_0$, $a_i$, and $b_i$, and
    reiterating the calculation process in order to minimize total moments within a predetermined convergence time.

7. The method according to claim 6, wherein the predetermined characteristic convergence time is of at least four times of an integration time step.

8. The method according to claim 1 or 2, wherein the step of determining the movement further comprises
    calculating, at the end of each iteration, induced velocity for each virtual blade element, which will be used in a next iteration to obtain aerodynamic velocity of each virtual blade element.

9. The method according to claim 8, wherein, to calculate the induced velocity, local induced velocity $v_i(s)$ and the induced velocity resulting from aerodynamic force of the virtual blade element $v_i^+(s)$ are related via a relationship $v_i(s)=G(s)v_i^+(s)$, where $G(s)$ is a transfer function that can be approximated by the following expression as a function of the characteristic time $\Delta t$:

$$G(s) = \frac{\left(\frac{2}{\Delta t}\right)^2}{\left(s+\frac{2}{\Delta T}\right)^2}.$$

10. The method according to claim 8, wherein, when there is aerodynamic interference between the first rotor and a second rotor, the step of determining the movement further comprises:
    including, in the calculation of the aerodynamic velocity of each virtual blade element of each rotor, not only the induced velocity of the first rotor but also the induced velocity of the second rotor, to obtain a reference induced velocity $\vec{v}_{i_p}$, resulting from aerodynamic action of the second rotor at a specific point of the first rotor disc, defined by its coordinates $(r_{ip}, \psi_{ip})$, and filtering the reference induced velocity $\vec{v}_{i_R}$ such that the reference induced velocity is attenuated in time.

11. The method according to claim 1 or 2, wherein the step of determining the movement further comprises accounting for variation in lift due to ground effect, which is modeled by means of reduction in induced velocity, such that the induced velocity with ground effect $(v_i)_{IGE}$ is related to the induced velocity without ground effect $(v_i)_{OGE}$ by means of ground effect factor, $k_G$, which is a ratio therebetween.

12. The method according to claim 1 or 2, wherein the step of determining the movement further comprises accounting for variation in lift due to ground effect by means of ground effect factor, $k_G$, as a function of the following parameters: rotor radius R, rotor distance to the ground $z_G$, and distance to the ground at which it is considered that the first rotor is outside the ground effect $z_{G\,max}$, where $k_G$ $$k_G = \frac{1 - \left(\frac{R}{4 \cdot z_G}\right)^2}{1 - \left(\frac{R}{4 \cdot z_{Gmax}}\right)^2}.$$

13. A real-time rotor performance simulator for a rotary wing aircraft having at least one rotor including a first rotor, the simulator comprising:

means for determining geometric data of one blade of the first rotor, on the basis of which movement of the first rotor is determined;

means for determining external forces and moments that affect each blade of the first rotor in each iteration of numerical real-time integration of equations of motion of the rotary wing aircraft;

means for discretizing the first rotor into virtual blade elements on which calculation to identify dynamic balance of the first rotor is to be performed, wherein the identifying dynamic balance includes:

means for determining, by a processor, the movement of the first rotor to obtain real-time aerodynamic actions that include forces transmitted to the rotary wing aircraft and moments with respect to articulations for each blade in each iteration, wherein the discretization is done on a first rotor disc instead of on each blade itself generating the virtual blade elements on an area covering the first rotor disc and each of the virtual blade elements is connected to the first rotor disc, which does not rotate, instead of to each blade, and wherein the discretization divides the first rotor disc circumferentially into $n_a$ sectors and radially into $n_e$ sectors, which results in $n_a \times n_e$ virtual blade elements.

* * * * *